US006955342B2

(12) United States Patent
Carson

(10) Patent No.: US 6,955,342 B2
(45) Date of Patent: Oct. 18, 2005

(54) FLUIDIZED SPRAY TOWER

(76) Inventor: William D. Carson, P.O. Box 2969, Renton, WA (US) 98056

( * ) Notice: Subject to any disclaimer, the term of this patent is extended or adjusted under 35 U.S.C. 154(b) by 0 days.

(21) Appl. No.: 10/198,288

(22) Filed: Jul. 17, 2002

(65) Prior Publication Data

US 2003/0015809 A1 Jan. 23, 2003

Related U.S. Application Data

(60) Provisional application No. 60/306,401, filed on Jul. 17, 2001, now abandoned.

(51) Int. Cl.[7] ................................................ B01F 3/04

(52) U.S. Cl. ................. 261/127; 261/117; 261/DIG. 9; 96/262; 96/360; 96/367

(58) Field of Search ........................ 261/115, 117, 118, 261/127, 128, 152, DIG. 9; 96/262, 360, 96/366, 367

(56) References Cited

U.S. PATENT DOCUMENTS 2,093,895 A * 9/1937 Mojonnier et al. ........... 159/22
2,937,013 A * 5/1960 Fisher ......................... 261/17
3,140,163 A * 7/1964 Hausberg ..................... 96/360
3,518,817 A * 7/1970 Dell'Agnese et al. ......... 96/360
3,546,851 A * 12/1970 Hardison et al. ............. 96/313
3,605,386 A * 9/1971 Erwin et al. .................. 96/236
3,691,731 A * 9/1972 Garcia ......................... 96/277
3,782,080 A * 1/1974 Gallagher .................... 96/261
3,981,156 A * 9/1976 Modisette et al. ........... 62/48.2
4,140,625 A * 2/1979 Jensen ........................ 208/146
4,210,428 A * 7/1980 Schneider et al. ............ 96/275
4,231,765 A * 11/1980 Scott ............................ 95/26
5,653,776 A * 8/1997 Taub ........................... 96/314

* cited by examiner

*Primary Examiner*—Scott Bushey
(74) *Attorney, Agent, or Firm*—R. Reams Goodloe, Jr.

(57) ABSTRACT

A fluidized spray vessel. A vessel design is provided for recovering heat from gaseous heat streams. The vessel utilizes a semi-fluidized bed for obtaining desirable liquid/vapor contact times. A spray section is provided in which liquid is sprayed through nozzles designed to provide a mean droplet size having a terminal velocity of from about sixty percent to about ninety five percent of the superficial upward gas velocity. These spray tower design criteria enhance spray tower performance, and thus enables more efficient heat recovery to be practiced, particularly in systems where relatively low grade heat sources are encountered.

27 Claims, 7 Drawing Sheets

| SYSTEM | CHAMBER | |
| --- | --- | --- |
| | SINGLE TYPE/FIG. | DOUBLE TYPE/FIG. |
| CLOSED | SC/5E | DC/5C |
| OPEN | SO/5D | DO/5B |

MODEL    X  X  XXX  XX

CHAMBERS ─┘

S=SINGLE
D=DUEL

SYSTEM ──────┘

C=CLOSED
O=OPEN

VESSEL DIAMETER ──────┘

OUTLET NOZZLE ──────────┘

FLUIDIZED SPRAY TOWER

RELATED APPLICATIONS

This application is based on, and claims priority from U.S. Provisional Patent Application Ser. No. 60/306,401, filed on Jul. 17, 2001 the disclosure of which is incorporated herein by this reference.

TECHNICAL FIELD

This invention relates to recovery of heat from hot gas streams, and, where appropriate, to the recovery of heat from moderate temperature combustion gas sources, such as boilers and incinerators. More specifically, the invention is directed to novel structures and methods for recovery of heat by direct contact of water with a hot gas stream.

BACKGROUND

Although various methods and structures have been provided for recovery of waste heat, in so far as is known to me, conventional counter-current spray towers heretofore have not provided for more than one transfer unit for either mass or energy transfer systems. In part, this is because in such conventional spray tower designs, droplets fall through a rising gas in which the gas superficial velocity is at only a fraction of the terminal velocity of entering droplets.

In contact devices, it is important to observe that as the average droplet diameter decreases, the total surface area for the liquid increases (area is proportional to 1 divided by the diameter of the average droplet). Also, an average contact period (dwell time) for a droplet entering a contact chamber depends on the terminal velocity of the droplet, its trajectory, and the path distance, as well as upon the velocity of the gas encountered.

Unfortunately, conventional spray tower design has not matched nozzle design developments. For the most part, conventional spray tower designs have ignored the use of any droplet diameter component, as a consequence of using design methods such as the Souder-Brown equation, in which no droplet diameter component appears. Thus, it would be desirable to provide an improved spray tower that utilizes improved spray nozzle technology to develop a narrow range of liquid droplet particle size. Also, it would be desirable to enhance spray tower performance by providing spray nozzles that maximize droplet surface area. Finally, it would be desirable to provide a spray tower in which dwell time is optimized, so as to optimize heat transfer between the droplet and the gas stream through which it flows.

SUMMARY

A novel semi-fluidized spray tower design has been developed, and is disclosed herein. The spray tower has been selected with spray nozzles with a predetermined mean droplet size and surface area. Increased droplet dwell time in the countercurrent gas stream is provided, compared to conventional spray tower design criteria. In one embodiment, a spray tower built according to this new method has three distinct sections, including, from bottom to top, (1) a fluidization section, (2) a semi-fluidization spray section, and (3) a coalescing section.

In one embodiment, such an innovative spray tower is provided in a single chamber design.

In yet another embodiment, the spray tower is provided in a two chamber design.

In various embodiments, the spray tower is provided in an open system, where water to be heated directly contacts the hot gas stream.

In other embodiments, the spray tower is provided in a closed system, where water to be heated does not directly contact the hot gas stream.

Various embodiments of the invention are disclosed in which the mechanical or functional features described herein are achieved in disparate physical configurations.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein.

In the various figures, a prime mark (') has been utilized to denote similar features or structures amongst the various embodiments, where appropriate, without further mention thereof. In such cases, the reader is referred to the discussion of the feature or structure with respect to other embodiments where similar features or structures were earlier introduced or explained, and a prime mark was not utilized in the referenced figure.

The foregoing figures, being exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the exemplary spray tower and a method of using the same to recover waste heat are also shown and briefly described to enable the reader to understand how various optional features may be utilized, in order to provide an efficient, reliable, semi-fluidized bed spray tower system.

DETAILED DESCRIPTION

Figure 1:
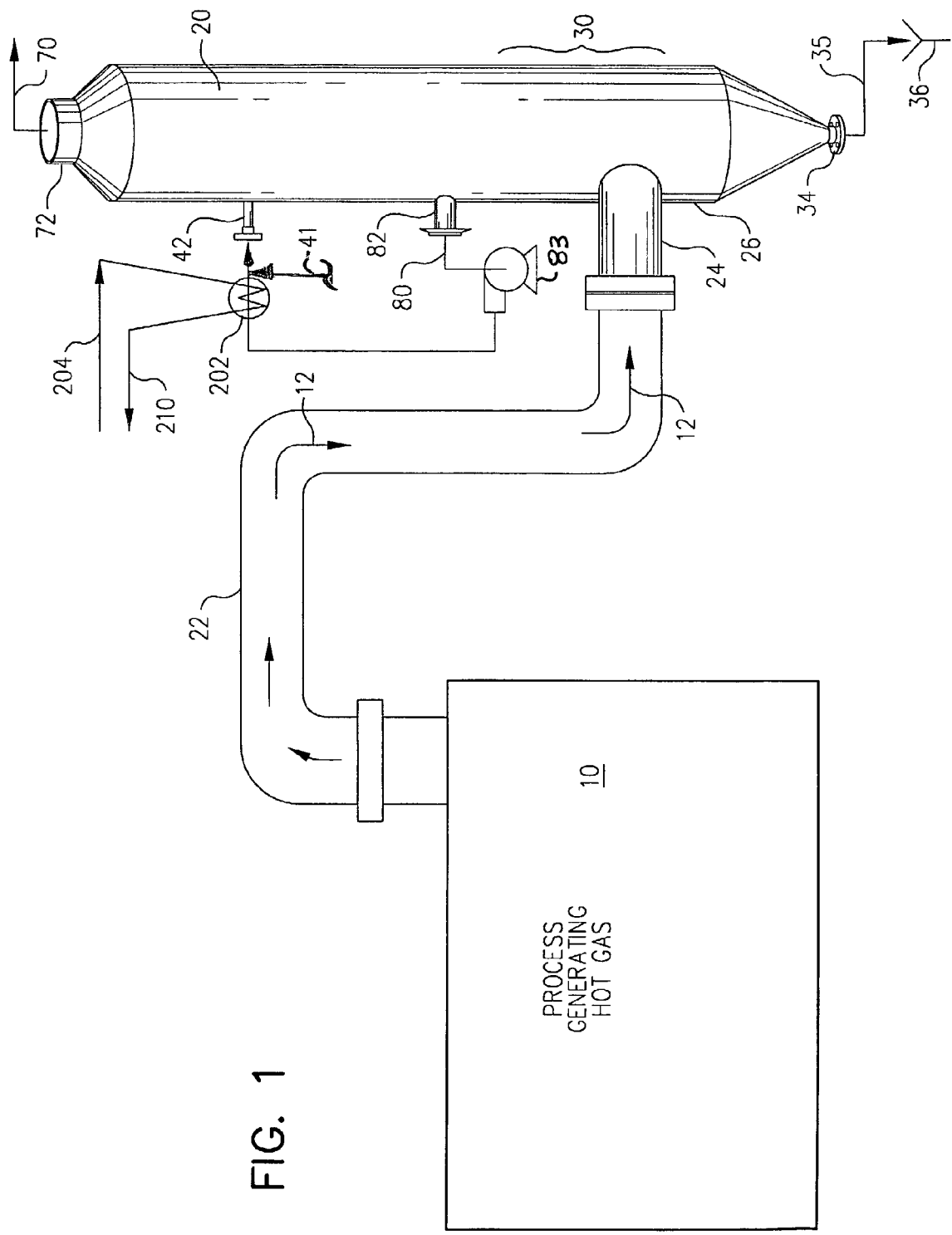
FIG. 1 shows a generalized system schematic that shows a process generating waste heat, a conduit for taking a hot gas stream containing the waste heat to the spray tower, and the innovative spray tower design provided herein.
Figure 2:
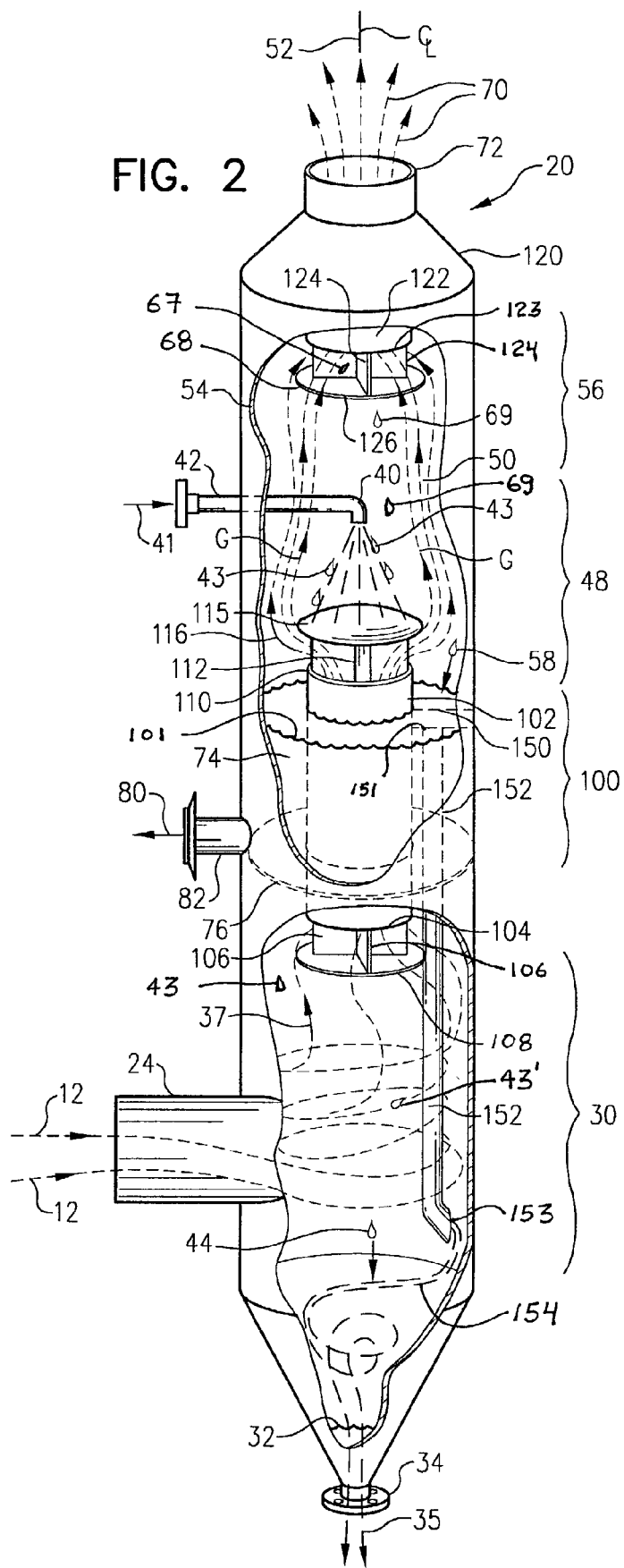
FIG. 2 provides a detailed view of a dual chamber fluidized spray vessel design.

In FIG. 1, an overall system configuration is depicted for a typical application for an innovative fluidized spray tower. FIGS. 1 and 2 depict the operation of a basic, two chamber type open spray tower design. In an open type design, there is direct contact between the hot gas stream and the liquid medium, normally water, which is to be heated.

Process equipment 10 such as a boiler generates hot exhaust gas 12. Hot exhaust gas may also be advantageously provided from an engine, such as a gas turbine engine. Or, the hot exhaust gas may be provided from a process gas stream in an industrial process plant such as a paper mill. Such hot gas 12 may include as primary constituents, water vapor, carbon dioxide, nitrogen, and a little oxygen, for example, in a typical boiler stack application. The hot gas 12 is provided to spray tower 20 through a hot gas conduit 22. Spray tower 20 structures may be fabricated using conventional fabrication techniques in a vertically standing substantially tubular cylindrical shell design. However, other convenient shapes may be utilized, and any of such equivalent structures may be utilized according to the teachings herein in a method of achieving heat recovery in a semi-fluidized direct contact heat transfer apparatus.

As better seen in FIG. 2, the hot gas 12 enters the spray tower 20 through a hot gas inlet 24, located in the lower portion 26 of the spray tower 20. The hot gas 12 is substantially prevented from downward escape by a waste condensate pool 32. Waste condensate 35 travels to sewer 36 through waste condensate drain 34.

After entry into spray tower vessel 20, the hot gas 12 gas enters the fluidization section 30 at the bottom portion of the spray tower 20. In the fluidization section 30 of tower 20, the upward gas velocity as represented by reference arrows 37 is designed for 200 percent or more of the terminal velocity of the mean droplet size of the liquid medium (usually water) preselected for the spray nozzles in the device, as further described herein below. In this section, it is desirable to prevent the downward flow and escape of liquid droplets.

A liquid medium such as cold water stream 41 is provided through cold water inlet 42. Water droplets 43 of a predetermined mean droplet size are generated by one or more sets of spray nozzles 40 that are provided in fluid communication with water inlet 42. The cold water stream 41 emerges through spray nozzles 40, which sprays droplets 43 downward, thus opposing the up flowing internal gas stream indicated by reference arrows G.

In the mid-tower semi-fluidized spray section 48, spray nozzles 40 (see FIG. 3, for example) are oriented to distribute droplets evenly downward over a cross-sectional area, in one embodiment, oriented perpendicular to the spray tower 20 vertical axis. Spray nozzles 40 are designed and provided to develop a pre-determined mean droplet size having a terminal velocity from about sixty (60) percent to about ninety five (95) percent of the local superficial upward gas velocity, the flow of which is indicated by reference arrows 50. Thus, in the upward flowing gas stream, the droplets fall relative to a fixed reference point along the vertical axis (indicated along centerline 52) at a rate from about five (5) percent to about forty (40) percent of their terminal velocity. Of course, in any spray nozzle system, some droplets are generated in a spectrum of droplet sizes that includes droplets larger and smaller than the mean preselected size. However, very small droplets entrain in the upward flowing gas stream and leave the semi-fluidized section 48. If such droplets do not impinge on the containment vessel interior walls 54 or other droplets 43, they are carried upward into the coalescing section 56 above the spray nozzles 40. However, large droplets, and those that become large droplets, fall, growing as they combine with other droplets, and eventually pass out of the semi-fluidized section and into the fluidized section. Other droplets 58 impinge on the tower walls and then flow down into the contact water reservoir 74. Initially, substantially all small water droplets 43 of preselected size are suspended at the top of the fluidized section 30, and do not fall down through the section until they agglomerate with other particles by increasing their size (droplet 43') and terminal velocity to ultimately become larger particles 44, which particles fall downward into waste condensate pool 32.

At the top of the tower, above spray from nozzle(s) 40, coalescing section 56 is provided in which a coalescing device 68 acts as a target to impinge and /or to intercept entrained droplets 67. The entrained droplets 67 are thus mostly captured by coalescing into larger droplets, and then the larger droplets 69 fall back from the coalescing section 56 into the semi-fluidized section 48.

A cooled gas stream 70 leaves the spray tower 20 at a cooled gas outlet 72. The heat removed from the entering hot gas stream 12 is thus captured in contact water contained in the contact water reservoir 74, supported by reservoir bottom plate 76. In the embodiment shown in FIG. 2, the reservoir bottom plate 76 is located intermediate the hot gas inlet 24 and the cooled gas outlet 72. A hot water stream 80 exits the reservoir 74 space outward via contact water reservoir outlet 82. Pump 83 can be provided to recirculate the water exit stream 80 for reuse in the semi-fluidized portion of spray tower 20, with makeup cold water stream 41 provided as necessary.

Figure 5A:
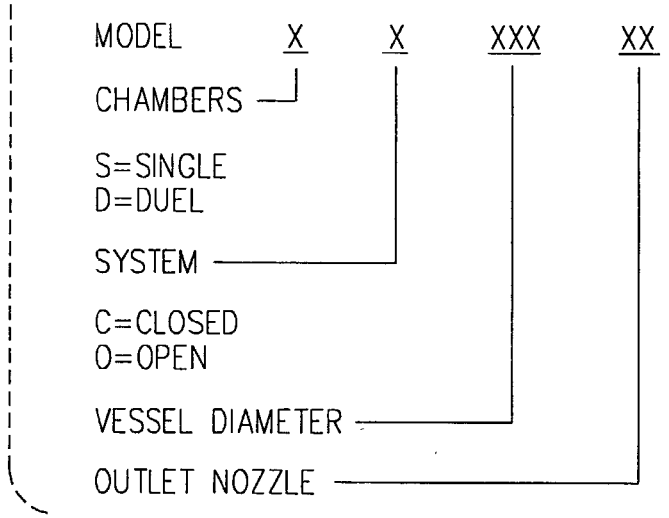
FIG. 5A provides a key to understanding the configurations illustrated in FIGS. 5B, 5C, 5D, and 5E.
Figure 5B:
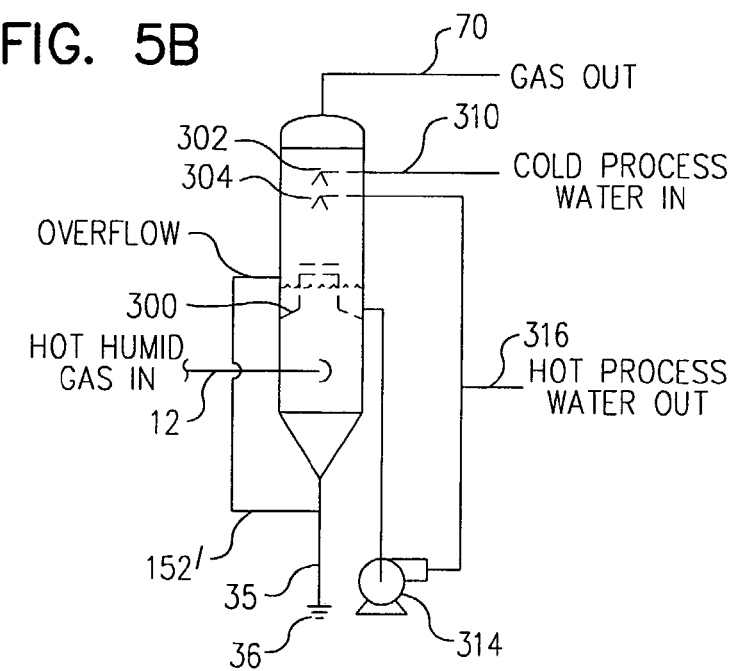
FIG. 5B shows a brief process diagram illustrating the use of a dual chamber, open or direct contact type system incorporating a fluidized spray tower.

With the operation of the basic two chamber type, open system spray tower 20 design having been described, as particularly set forth in FIG. 2 and more generally in FIG. 5B, it is appropriate to describe alternate embodiments and additional structural details. First, with respect to FIG. 2, in the mid-portion 100 of tower 20, the contact water reservoir bottom plate 76 supports not only the contact water 101 captured, but also provides support for, and is sealingly affixed to, an upward oriented first gas passageway 102, tubular in nature, and in the embodiment shown in FIG. 2, a cylindrical tube that is located along the centerline 52 of the spray tower 20. At the lower end 104 of first gas passageway one or more baffle(s) 106 and endplate 108 provide for a desirable change in direction of entering gas, to help deflect droplets. At the upper end 110 of first gas passageway, one or more baffle(s) 112 and endplate or hat portion 115 provide for deflection of downwardly oriented spray of droplets, and provide a tortuous gas path having desirable change in direction for the upwardly direct gas 116 exiting the first gas passageway 102.

At the upper portion 120 of the spray tower 20, a second gas passageway 122 is provided. As shown in the embodiment depicted in FIG. 2, the second gas passageway 122 is also of a cylindrical tubular shape. At the lower end 123 of the second gas passageway 122, one or more baffle(s) 124 are provided as well as end plate or target 126 (circular, as depicted affixed to baffles 124), to assist in impinging and/or intercepting droplets, by providing a tortuous gas pathway through which the exiting gas must flow, in order to minimize droplets lost via entrainment.

At the upper water level limit 150 of the reservoir 74 for contact water or other liquid medium, a downwardly extending reservoir drain pipe 152 is provided, extending from upper end 151 downward through bottom plate 76 and on downward toward the lower portion 26 of the vessel 20, to a lower end 153, in fluid communication with drain 34, and thus allowing condensate 154 to join waste condensate 35 to drain out of vessel 20 through the waste condensate drain 34.

Figure 5C:
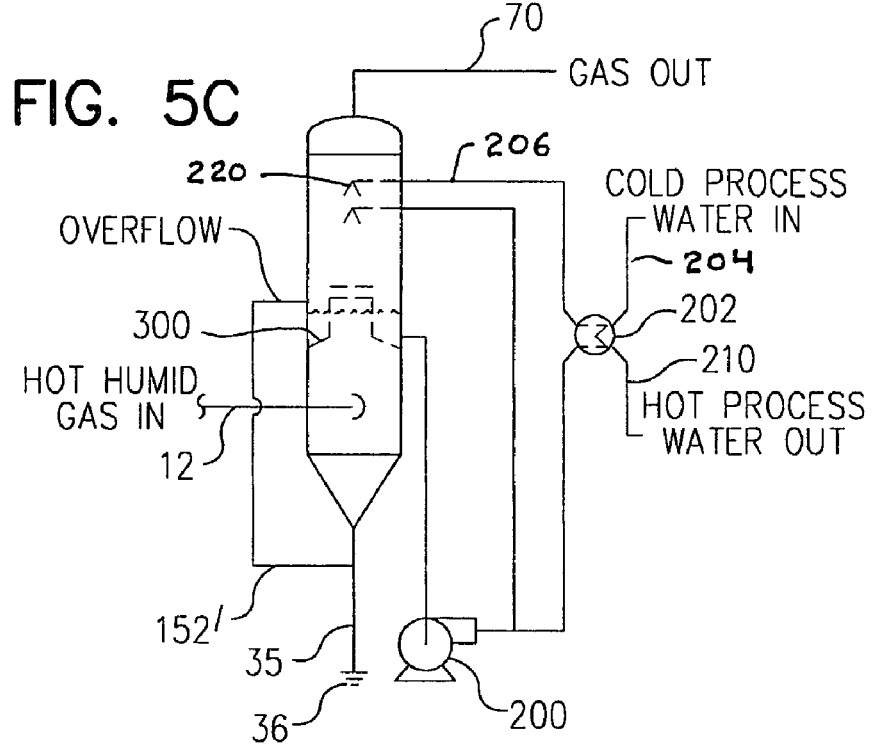
FIG. 5C shows a brief process diagram illustrating the use of a dual chamber, closed or indirect contact type system incorporating a fluidized spray tower.
Figure 5D:
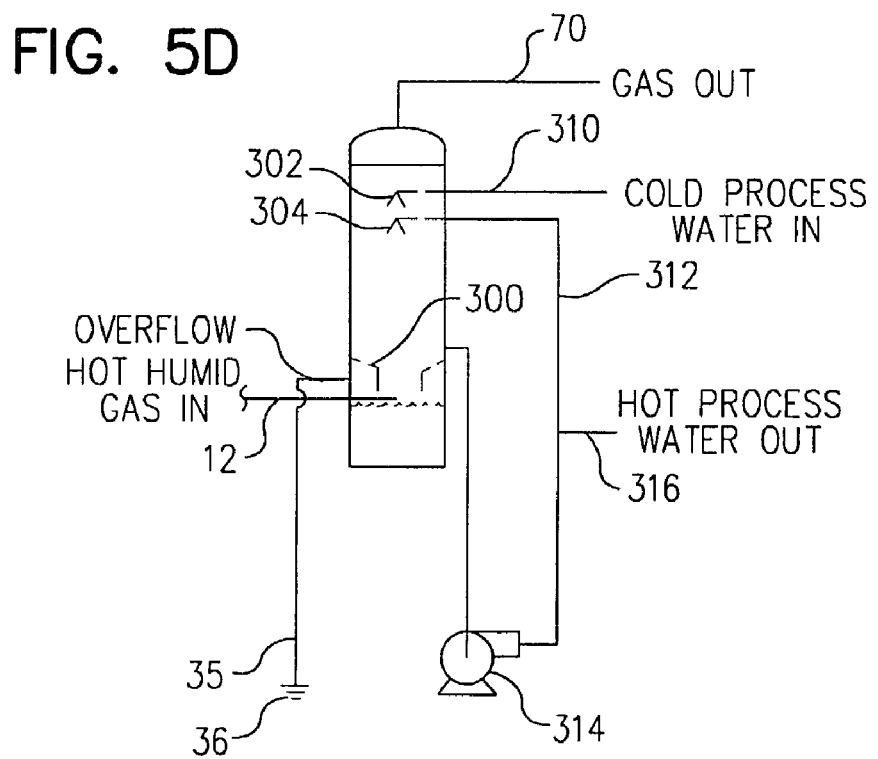
FIG. 5D shows a brief process diagram illustrating the use of a single chamber, open or direct contact type system incorporating a fluidized spray tower.
Figure 5E:
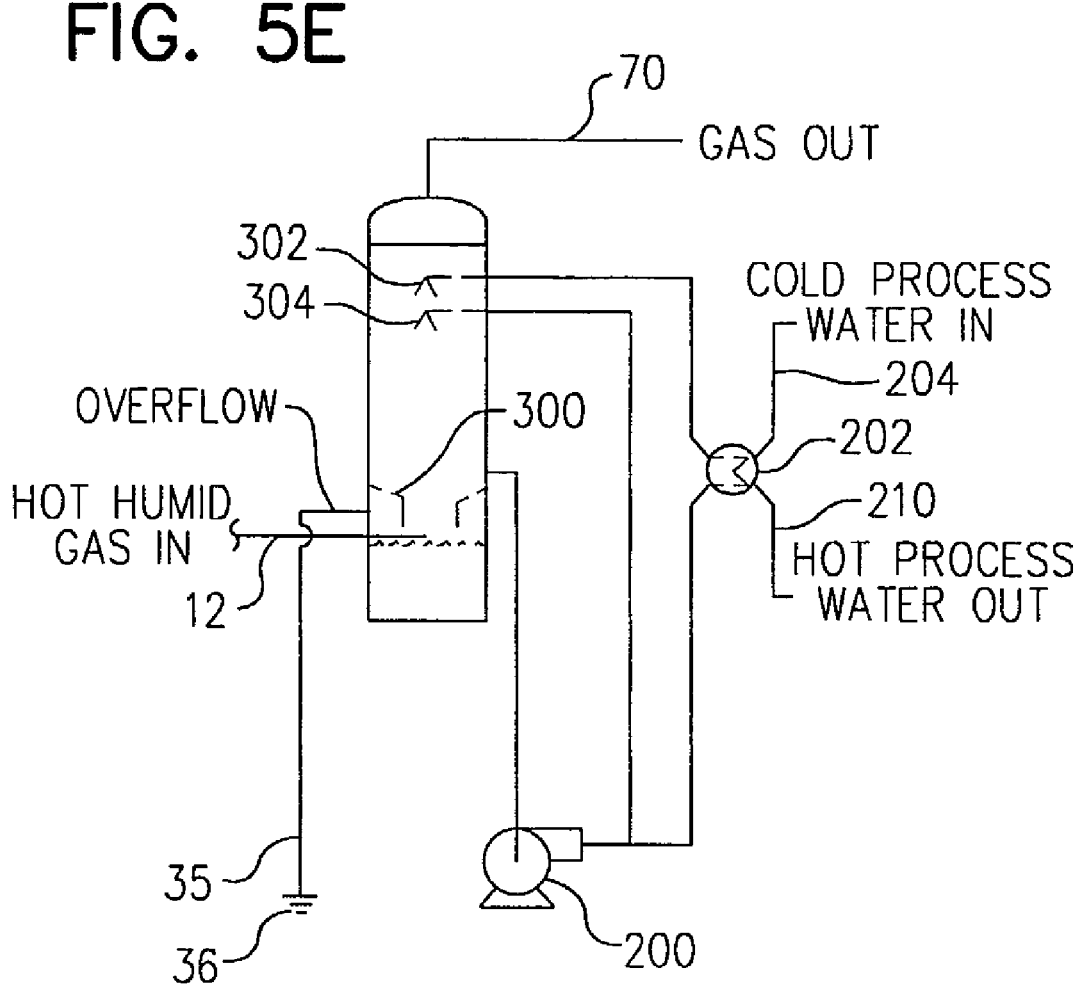
FIG. 5E shows a brief process diagram illustrating the use of single chamber, closed or indirect contact type system incorporating a fluidized spray tower.

In other embodiments, a closed process system design can be provided as indicate in FIGS. 5C and 5E. First, in FIG. 5C, water 80 leaving the contact water reservoir 74 is sent to a pump 200, which provides motive force for sending the water through a heat exchanger 202. Heat exchanger 202 is provided with a cold water supply stream 204, which cold water supply stream is heated in the heat exchanger 202 to provide a hot, non-contact water stream 210 exiting the heat exchanger 202. The cooled contact water stream 206 enters vessel as the inlet cold water stream at spray nozzles 220.

A single chamber embodiments is illustrated in FIGS. 5D and 5E. Like in the case of a dual chamber design, the single chamber design can be provided in either (1) a direct contact design, or (2) a closed system, non-contact design. Note that in the single chamber design depicted in these figures, the bottom portion 30 as shown in vessel 20 of FIG. 2 is dispensed with, and the hot gas enters directly under baffling 300 and shortly encounters spray from nozzles 302 and/or 304. Note that both an outside, cold water inlet stream 310 is provided, as well as a recycle stream 312, sent through pump 314, to further warm the process water recirculating in the unit. Pump 314 also serves as a hot contact process water 316 outlet. Overflow is sent outward through internal reservoir outlet or drain 152' and is then sent to sewer 36 or other appropriate end use or disposal point. If the configuration is for a closed system design, as set forth in FIG. 5E, then a heat exchanger system as earlier explained in relation to FIG. 5C is utilized.

Figure 3:
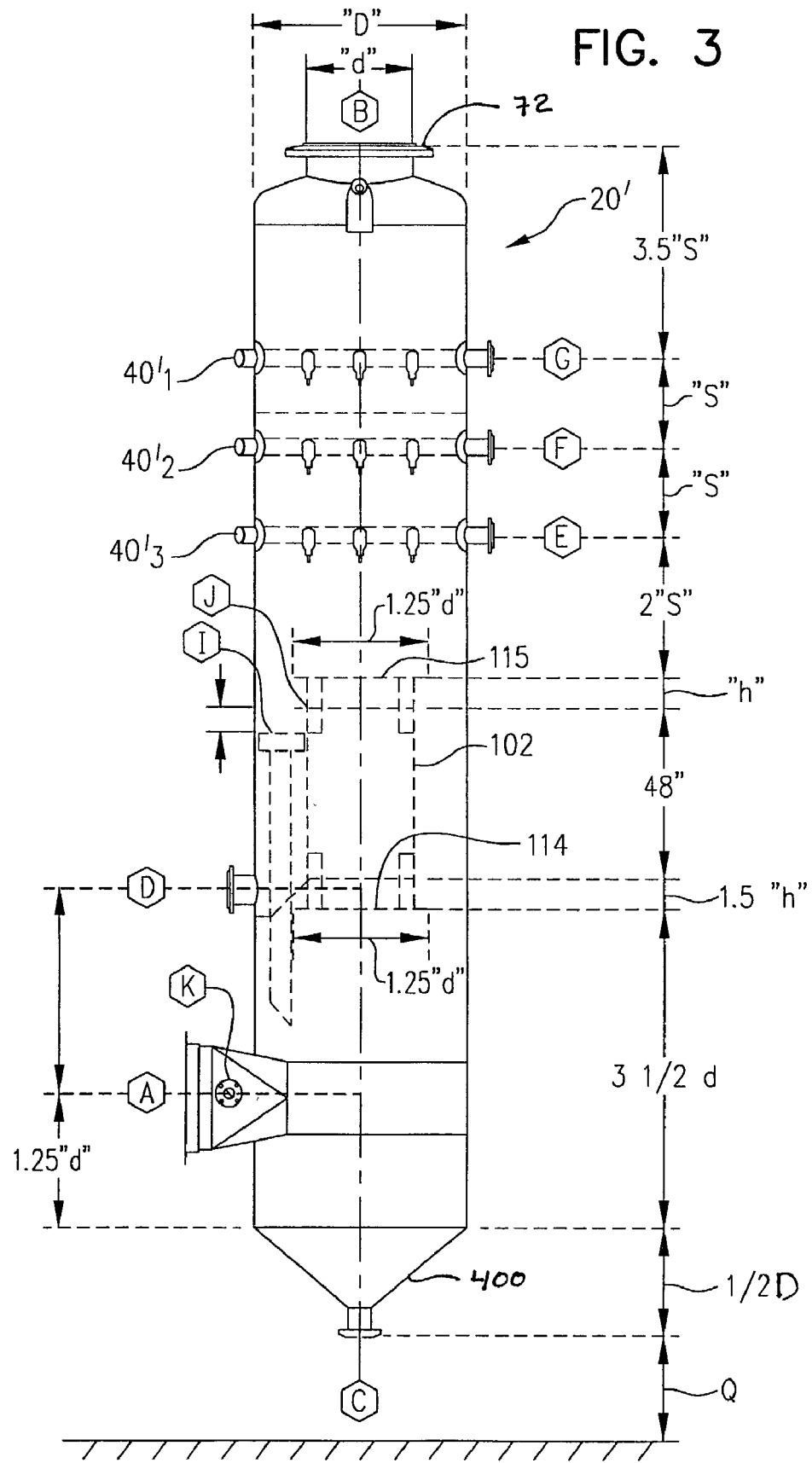
FIG. 3 provides a vertical schematic of a dual chamber fluidized spray tower, indicating certain key dimensional data.

Turning now to FIG. 3, some exemplary dimensional data for one desirable embodiment of spray vessel 20' are illustrated. As shown, the spray nozzles 40' are located a distance S apart, vertically. From the upper row of nozzles 40'$_1$ to the top of the vessel 20', a distance 3.5S is provided. From the lower nozzle 40'$_3$ a distance of 2S is provided above the outlet end 115 of the first gas passageway 102. Also, first gas passageway 102 is shown in a 48 inch height, which may be desirable in many cases, but that distance should be considered merely exemplary for this one embodiment. Various other dimensions are detailed, including a lower portion 30 (reference FIG. 2) dimension of 3.5 times the diameter "d" of the gas outlet 72. A sloping bottom sump 400 is provided in a height of 0.5 times the overall vessel 20' diameter D.

Figure 4:
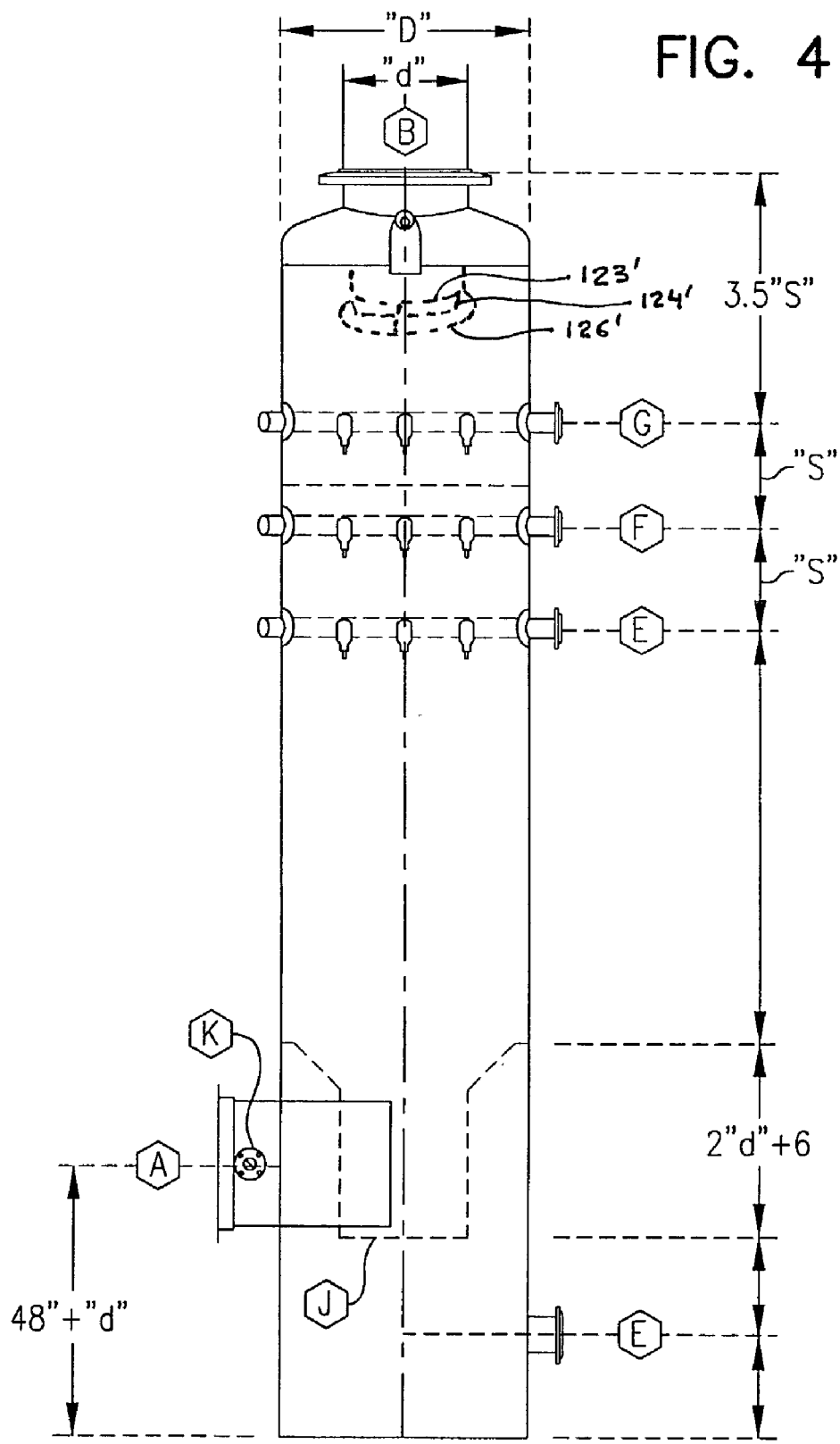
FIG. 4 provides a vertical schematic of a single chamber fluidized spray tower, indicating certain key dimensional data.

Similar dimensions are indicated in FIG. 4 for a single vessel chamber design of the type schematically illustrated in FIGS. 5D and 5E.

It is to be appreciated that the various aspects and embodiments of the fluidized spray tower designs described herein are an important improvement in the state of the art, especially for recovery of heat from low grade heat sources. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. An apparatus for recovering heat from a heat containing gaseous stream, by transfer of said heat into a liquid medium, said apparatus comprising:
   (a) a containment vessel having an interior wall, said vessel extending along a central axis and having
      (i) a hot gas inlet,
      (ii) a cooled gas outlet, and
      (iii) a condensate drain;
   (b) intermediate said hot gas inlet and said cooled gas outlet, a contact liquid medium reservoir bottom plate,
   (c) a first gas passageway, said first gas passageway having (i) a passageway inlet, (ii) a passageway outlet, and (iii) a passageway wall extending from said passageway inlet to said passageway outlet, said first gas passageway sealingly affixed to and upwardly extending from said contact liquid medium reservoir bottom plate a preselected distance to define, from said contact liquid medium reservoir bottom plate to said outlet, a contact liquid medium reservoir space for holding said liquid medium;
   (d) a liquid medium outlet, said liquid medium outlet adapted for removing liquid medium from said liquid medium reservoir space;
   (e) a liquid medium inlet, said liquid medium inlet located between said outlet end of said first gas passageway and said cooled gas outlet of said vessel;
   (f) in fluid communication with said liquid medium inlet, one or more spray nozzles, said spray nozzles adapted to spray said liquid medium downward toward said first gas passageway outlet;
   (g) a coalescer, said coalescer located adjacent said cooled gas outlet of said vessel, and adapted to coalesce liquid droplets attempting to escape outward through said hot gas outlet.

2. The apparatus as set forth in claim 1, further comprising a reservoir overflow drain, said reservoir overflow drain having a reservoir overflow drain inlet below the level of said first gas passageway outlet.

3. The apparatus as set forth in claim 2, wherein said reservoir overflow drain outlet is in fluid communication with said condensate drain of said vessel.

4. The apparatus as set forth in claim 1, wherein said first gas passageway further comprises one or more inlet baffles.

5. The apparatus as set forth in claim 1, wherein said first gas passageway further comprises one or more outlet baffles.

6. The apparatus as set forth in claim 1, wherein said coalescer comprises a second gas passageway, said second gas passageway located between said spray nozzles and said cooled gas outlet.

7. The apparatus as set forth in claim 6, wherein said second gas passageway further comprises one or more inlet baffles.

8. The apparatus as set forth in claim 1, further comprising an outlet nozzle, said outlet nozzle adapted to receive headed liquid medium from said contact liquid medium reservoir.

9. The apparatus as set forth in claim 1, wherein said first gas passageway is provided in a cylindrical tubular configuration.

10. The apparatus as set forth in claim 1, wherein said first gas passageway is centrally located along said longitudinal axis of said vessel.

11. The apparatus as set forth in claim 1, wherein said first gas passageway comprises a tortuous gas path for said hot gas passing through said first gas passageway, whereby passage of droplets of liquid medium therethrough are minimized.

12. The apparatus as set forth in claim 5, wherein said first gas passageway comprises a hat portion, said hat portion at or near said one or more outlet baffles, said hat portion configured to deflect droplets of liquid medium from said spray nozzles so as to prevent entry of said droplets into said first gas passageway.

13. The apparatus as set forth in claim 1, wherein said vessel comprises a semi-fluidized portion, said semi-fluidized portion including said spray nozzles, and wherein said spray nozzles are sized and shaped to develop a preselected mean droplet size of liquid medium sprayed therethrough having a terminal velocity from about sixty percent to about ninety five percent of the superficial gas velocity of hot gas traveling upward through said semi-fluidized section, such that said liquid medium droplets fall relative to a fixed reference point in said semi-fluidized section from about five percent to about forty percent of the terminal velocity of said droplets.

14. The apparatus as set forth in claim 13, wherein said vessel further comprises, a fluidized section, and wherein said vessel has an effective cross sectional area in said fluidized section sized and shaped so that the superficial gas velocity of hot gas traveling upward through said fluidized section is about 200 percent or more of the terminal velocity of droplets having said preselected mean droplet size.

15. The apparatus as set forth in claim 7, wherein said coalescing section comprises a target situated to impinge and/or intercept droplets traveling toward said cooled gas outlet.

16. The apparatus as set forth in claim 15, wherein said coalescing section comprises one or more inlet baffles, and wherein said target comprises a circular disc affixed to at least one of said one or more inlet baffles.

17. A method of recovering heat from a hot gas by transferring heat to a liquid medium, said method comprising:

(a) providing a vessel as set forth in claim 1;

(b) providing a semi-fluidized spray section in said vessel, said spray section having downwardly directed spray nozzles for spraying a liquid medium into which heat is to be recovered from said gas, said spray nozzles sized and shaped to develop a mean droplet size having a terminal velocity from about sixty percent to about ninety five percent of the superficial upward gas velocity in said semi-fluidized bed section, such that said droplets fall relative to a fixed reference point in said spray section from about five percent to about forty percent of the terminal velocity of said droplets.

18. The method as set forth in claim 17, further comprising providing, in the lower portion of said vessel, a fluidization section wherein the upward gas velocity is in excess of two hundred percent of the terminal velocity of droplets.

19. The method as set forth in claim 17, wherein said liquid medium comprises water.

20. The method as set forth in claim 17, wherein said hot gas comprises an exhaust gas from combustion of a fuel.

21. The method as set forth in claim 20, wherein said exhaust gas comprises stack gas from a boiler.

22. The method as set forth in claim 20, wherein said exhaust gas comprises exhaust from an engine.

23. The method as set forth in claim 22, wherein said engine comprises a gas turbine engine.

24. The method as set forth in claim 17, wherein said hot gas comprises a process gas stream from an industrial process plant.

25. The method as set forth in claim 24, wherein said industrial process plant comprises a paper mill.

26. The method as set forth in claim 17, wherein said hot gas directly contacts said liquid medium to be heated.

27. The method as set forth in claim 17, further comprising (1) an external heat exchanger, and (2) an intermediate heating medium, wherein said hot gas heats said intermediate heating medium, and wherein a liquid stream which does not directly contact said hot gas is heated.

* * * * *

UNITED STATES PATENT AND TRADEMARK OFFICE
CERTIFICATE OF CORRECTION

| | | |
|---|---|---|
| PATENT NO. | : 6,955,342 B2 | Page 1 of 1 |
| APPLICATION NO. | : 10/198288 | |
| DATED | : October 18, 2005 | |
| INVENTOR(S) | : William D. Carson | |

It is certified that error appears in the above-identified patent and that said Letters Patent is hereby corrected as shown below:

Column 6, line 33, after the words "said liquid medium outlet", delete "adapted for removing" and substitute therefor --configured for removal of--.

Column 6, line 42, after reference (g), insert --downstream of said liquid medium inlet,--.

Column 6, line 44, after the words "outlet of said vessel,", delete "and adapted", and substitute therefor --said coalescer configured--.

Column 6, line 45, after the words "outward through said", delete "hot" and substitute therefor --cooled--.

Column 6, line 66, after the words "nozzle adapted to receive", delete "headed" and substitute therefor --heated--.

Column 7, line 9, after the words "gas passing", insert --upwardly--.

Column 7, line 9, after the words "passageway, whereby", insert --downward--.

Column 7, line 15, after the words "droplets of liquid medium", insert --falling downwardly--.

Signed and Sealed this

Twenty-ninth Day of December, 2009

David J. Kappos
*Director of the United States Patent and Trademark Office*